United States Patent
Rybkin (10) Patent No.: US 10,200,448 B2
(45) Date of Patent: Feb. 5, 2019

(54) OPTIMIZING DATA EXCHANGE BETWEEN CLIENT DEVICE AND SERVER

(71) Applicant: ABBYY Development LLC, Moscow (RU)

(72) Inventor: Vladimir Rybkin, Moscow (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 224 days.

(21) Appl. No.: 15/378,581

(22) Filed: Dec. 14, 2016

(65) Prior Publication Data

US 2018/0167440 A1    Jun. 14, 2018

(30) Foreign Application Priority Data

Dec. 9, 2016 (RU) .............................. 2016148429

(51) Int. Cl.
    *H04L 29/08*    (2006.01)
(52) U.S. Cl.
    CPC .......... *H04L 67/06* (2013.01); *H04L 67/2828* (2013.01); *H04L 67/2857* (2013.01)
(58) Field of Classification Search
    CPC .. H04L 67/06; H04L 67/2828; H04L 67/2857
    See application file for complete search history.

(56) References Cited

U.S. PATENT DOCUMENTS

| | | | |
|---|---|---|---|
| 8,144,990 B2 | 3/2012 | Englund et al. | |
| 8,620,058 B2 | 12/2013 | Nepomniachtchi et al. | |
| 9,036,912 B2 | 5/2015 | Meyer et al. | |
| 9,113,002 B2 | 8/2015 | Zhang et al. | |
| 2009/0213406 A1* | 8/2009 | Kimura | G06K 15/02 358/1.13 |
| 2010/0009713 A1 | 1/2010 | Freer | |

(Continued)

OTHER PUBLICATIONS

Manoj, Kumar M., et al. "Client Server based Image Enhancement in Android Phones", Special Issue of International Journal of Computer Applications (0975-8887), International Conference on Electronic Design and Signal Processing (ICEDSP) Nov. 5-6, 2012, 4 pages.

(Continued)

*Primary Examiner* — El Hadji M Sall
(74) *Attorney, Agent, or Firm* — Lowenstein Sandler LLP (57) ABSTRACT

An original image of a physical document is received by a client device, a reduced file containing data indicative of a document type is created based on the original image that is substantially smaller in size than the original image. The client device sends a request including the reduced file to a server for information pertaining to a document type for the physical document, receives location information based on the document type from the server for at least one portion of the original image that contains at least one content item for the physical document, and extracts the at least one portion of the original image based on the location information to generate at least one extracted portion of the image. The client device sends a second request including the at least one extracted portion of the image to the server for the at least one content item. Responsive to receiving the at least one content item from the server device, the client device provides the at least one content item for display.

30 Claims, 8 Drawing Sheets

(56) References Cited

U.S. PATENT DOCUMENTS

2010/0014668 A1\* 1/2010 Yoshioka ........... H04N 1/32128
380/243
2010/0031014 A1\* 2/2010 Senda ..................... G09C 5/00
713/150
2015/0310291 A1 10/2015 Cuthbert et al.

OTHER PUBLICATIONS

Kumar, Shyam Sunder, et al. "Mobile Object Detection through Client-Server based Vote Transfer", 2012 IEEE Conference on Computer vision and Pattern Recognition (CVPR), Jun. 16-21, 2012, 8 pages.

\* cited by examiner

DOCUMENT IMAGE 410

CH Gourmet Gifts

13 East 54th Street
New York, NY 10034
Phone: 206-555-2078
Fax: 206-555-2081

INVOICE

DATE: 1/1/200
INVOICE # 100

LOCATION INFORMATION 420-A

Bill To:
Alexander O'Brien
Manxsys Financial
3354 Yookland Ave.
Seattle, WA 98463
Phone: 206-555-2078

| SALESPERSON | P.O. NUMBER | SHIP DATE | SHIP VIA | F.O.B. POINT | TERMS |
|---|---|---|---|---|---|
| Chris Huffman | | | | | Due on receipt |

| QUANTITY | DESCRIPTION | UNIT PRICE | AMOUNT |
|---|---|---|---|
| 1.00 | Coffee<br>Brand-K - 2 lbs pack | 12.50 | 12.50 |
| 1.00 | Chocolate Sampler | 12.00 | 12.00 |

SUBTOTAL $ 24.50
TAX RATE 5.00%
SALES TAX 1.23
TOTAL $ 25.73

LOCATION INFORMATION 420-B

IMAGE FRAGMENT 430-A

INVOICE # 100

IMAGE FRAGMENT 430-B $ 25.73

OPTIMIZING DATA EXCHANGE BETWEEN CLIENT DEVICE AND SERVER

CROSS REFERENCE TO RELATED APPLICATIONS

The present application claims the benefit of priority under 35 USC 119 to Russian Patent Application No. 2016148429, filed Dec. 9, 2016; the disclosure of which is incorporated herein by reference in its entirety for all purposes.

TECHNICAL FIELD

The present disclosure is generally related to computer systems, and is more specifically related to systems and methods for optimizing data exchange between a client device and a server.

BACKGROUND

Mobile devices such as mobile phones, smart phones, tablet computers, etc. are a popular platform for application programs. In many cases, an application program executing on a mobile device may communicate with a server system. A client-server application model is a distributed application structure that partitions tasks or workloads between a provider of a resource or service (a server), and a service requester (a client). Clients and servers may communicate over a computer network, which can involve large amounts of data transfer.

SUMMARY

Embodiments of the present disclosure describe optimized data exchange between a client device and a server device. An original image of a physical document is received by a client device, a reduced file containing data indicative of a document type is created based on the original image that is substantially smaller in size than the original image. The client device sends a request including the reduced file to a server device for information pertaining to a document type for the physical document, receives location information based on the document type from the server device for a portion of the original image that contains a content item for the physical document, and extracts the portion of the original image based on the location information to generate an extracted image. The client device sends a second request including the extracted portion of the image to the server device for the content item. Responsive to receiving the content item from the server device, the client device provides the content item for display.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for optimizing data transfer between client devices and server devices. Mobile devices are becoming increasingly popular as a platform for applications. However, many conventional mobile devices include fewer resources (e.g., memory, processing power, storage, etc.) than larger computer systems (desktops, laptops, etc.), which can limit the processing power of the application on the mobile device. In some implementations, client-server applications may be implemented on mobile devices to remedy the resource deficit, allowing the processing load to be distributed between the mobile device and a server system that includes significantly more powerful capabilities. In such implementations, an application may execute on a mobile device that communicates with a counterpart application that executes on a server device. The mobile device may communicate with the server via a network connection to transfer data between the two. However, with this framework the communication channel can act as bottleneck for the overall application effectiveness. This may be particularly problematic where an application involves the transfer of large data files such as images or video streams.

For example, applications that involve document identification/classification and optical character recognition (OCR) images captured by a camera on a mobile phone may involve large amounts of data to be processed. A mobile device typically does not have the processing power to complete these operations, so may need to send that data to a server system to complete the processing. A network connection with limited bandwidth, or that is throttled due to the amount of data being transferred may negatively impact the effectiveness of the application transferring such files.

Aspects of the present disclosure address the above noted and other deficiencies by implementing a data exchange optimizer to exchange small amounts of information during interaction between an application on a client device and a counterpart application on a server device. In an illustrative example, an original image of a physical document is received by a client device. A reduced file is created that is substantially smaller in size than the original image, but that retains enough structural information for the document type to be determined. The reduced file is sent to a server system which completes the document identification to determine a document type. The mobile device receives location information based on the document type from the server system for a portion of the original image that contains a content item for the physical document. The mobile device may then extract a portion of the original image based on the location information to generate an extracted portion of the original image, and send that extracted image portion to the server for further processing. The mobile device may receive the actual content item included in the extracted image and provide the content for display or use by another application.

Aspects of the present disclosure are thus capable of optimizing data exchange between client devices and server devices by significantly reducing the amount of data transferred across a communication channel. Particularly, the client device can limit the amount of data sent to the server to no more than that which is necessary to complete the application task. Thus, the efficiency of client-server applications can be substantially improved when using low bandwidth network communication channels without impacting the quality of results.

Figure 1:
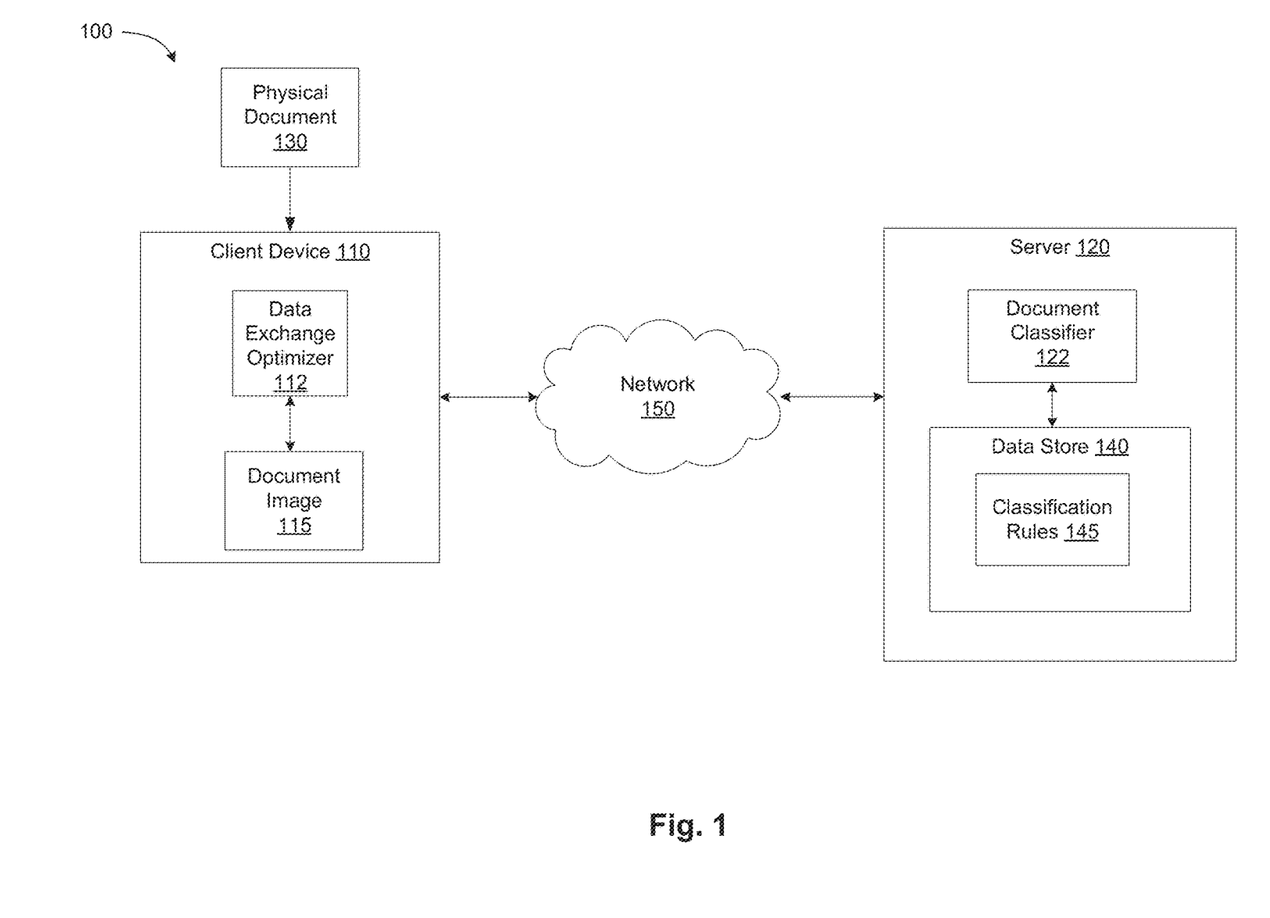
FIG. 1 depicts a high-level diagram of an example networked environment, in accordance with one or more aspects of the present disclosure.

FIG. 1 is a block diagram illustrating a networked environment 100 in which embodiments of the present disclosure may be implemented. The networked environment 100 can include one or more client devices 110, and one or more servers 120, which can be in data communication with each other via network 150. Computer system 800 illustrated in FIG. 8 may be one example of a client device 110. The network 150 may include, for example, the Internet, intranets, extranets, wide area networks (WANs), local area networks (LANs), wired networks, wireless networks, mobile/cellular networks, or other suitable networks, etc., or any combination of two or more such networks. For example, such networks may comprise satellite networks, cable networks, Ethernet networks, and other types of networks.

Client device 110 may be a processor-based device that includes a camera capable of receiving an image such as a mobile phone (cellular phone, smart phone, etc.), personal data assistant (PDA), tablet computer system, camera, video camera, laptop computer, etc. Alternatively, client device 110 may be a processor based device capable of maintaining a photograph library or receiving an image from a photograph library such as the above mentioned devices as well as desktop computers, set-top boxes, music players, game consoles, electronic book readers, or other devices with similar capability.

In some implementations, client device 110 may additionally include one or more applications (not pictured) that manage the extraction of information from an image of a physical document (e.g., document image 115). For example, client device 110 may include an application that can present a user interface to a user to take a photograph of an invoice. The application may then extract information such as the invoice number and the amount due, and present that information to the user via the user interface. In another example, client device 110 may include an application that can allow the user to take a photograph of a driver's license to extract the driver's license number, the driver's name and address, or other personal information in order to conduct a background check of the license holder. In another example, client device 110 may include an application that can allow the user to capture a video stream of multiple documents and extract the individual frames from the stream that include images of physical documents. In another example, client device 110 may include an application that can allow the user to photograph a list of purchases (e.g., a receipt from a retail store) to identify and categorize each purchase on the list (e.g., food item, clothing item, toy, travel expense, business expense, etc.).

In each of the above examples, the client application may need to determine the type of document depicted by a captured image as well as determine the content within the portions of the captured image. Client device 110 may not include sufficient resources to complete the document analysis, document classification, and information extraction. Consequently, client device 110 may communicate with server 120 to perform one or more of these functions. In such embodiments, client device 110 may include data exchange optimizer 112 to facilitate optimized data exchange between client device 110 and server 120 where the resources of network 150 are limited. In some implementations, data exchange optimizer 112 may be incorporated into an application on the client device 110. Alternatively, data exchange optimizer 112 may be a component that executes on the client device 110 that is invoked by a separate application.

Server 120 may include, for example, a server computer or any other system providing computing capability. Alternatively, server 120 may employ a plurality of computing devices that may be arranged, for example, in one or more server banks or computer banks or other arrangements. Such computing devices may be positioned in a single location or may be distributed among many different geographical locations. For example, server 120 may include a plurality of computing devices that together may comprise a hosted computing resource, a grid computing resource and/or any other distributed computing arrangement.

In some implementations, server 120 can include a document classifier 122 and a data store 140. Document classifier 122 may provide document classification and/or data extraction services to applications executing on client device 110. Document classifier 122 may receive an image from client device 110, determine a document type associated with the image, and send information about the document type to the client device 110. Additionally, document classifier may extract content from images or image fragments and provide the extracted content to client device 110.

In some implementations, server 120 can include a data store 140 which may store classification rules 145. Data store 140 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Classification rules 145 may be a data structure that stores rules associated with determining a document type based on a received image. For example, classification rules 145 may store information that relates structural characteristics of images of physical documents to a hypothesis for the type of document within the image. Additionally or alternatively, classification rules 145 may store optical character recognition (OCR) rules that document classifier 122 may use to extract text from images or image fragments received from client device 110.

In an illustrative example, a user may initiate an application on client device 110 and capture an image of physical document 130 via a camera of the device. In one embodiment, client device 110 can capture a single still image (e.g., a photograph) of physical document 130. Alternatively, client device 110 may capture a video stream of one or more physical documents 130, where the video stream is made up of multiple image frames. The application may store the document image 115 (e.g., the image of the physical document 130) locally on client device 110 (e.g., in memory, temporary storage, a data store on the device, etc.). In other embodiments, the application may obtain an image from a photo library available to client device 110. The application may then invoke data exchange optimizer 112 to extract content from document image 115 using optimized data exchange between the client device 110 and the server 120.

Data exchange optimizer 112 may receive document image 115 and create, based on the received image, a reduced file that is substantially smaller in size than the original document image 115. Data exchange optimizer 112 may create the reduced file by performing one or more data transformation operations on the original image to create a file of reduced size, but that contains data indicative of a document type of physical document depicted in the document image 115. In some implementations, the transformation operation may involve performing a color to grayscale conversion, a color to black and white conversion, a data compression operation, an image resolution reduction operation, a binarization operation, or the like. An example transformation operation is discussed in further detail below with respect to FIGS. 2-3.

In some implementations, rather than create a reduced file that is representative of the entire original document image 115, data exchange optimizer 112 may select a fragment of the original document image 115 as the reduced file. For example, a client application may be configured to manage a particular document type and thus may already be aware of the location of particular types of content within the image. In such cases, the application may direct data exchange optimizer 112 to select the portion of the original image that includes that particular type of content. For example, an application may be configured to receive in image of an invoice or shipping label document that includes a bar code in a particular position. Data exchange optimizer 112 may extract the portion of the document image containing the bar code to create the reduced file that contains only the bar code image. Thus, in this case, the reduced file may maintain a similar image resolution to that of the original image, but will be smaller than the original document image since it includes only the bar code image and not the rest of the original document image.

Data exchange optimizer 112 may then send a request to server 120 for information pertaining to the document type for physical document 130, where the request includes the reduced file. In some implementations, data exchange optimizer 112 may be invoked by a "thin client" application that does not perform any determinations regarding the document type. In such cases, the client device 110 relies on server 120 to determine the document type and to identify potential content items of interest to the client device based on the document type. An example sequence diagram for data exchange between a "thin client" and a server is depicted below with respect to FIG. 6. Alternatively, data exchange optimizer 112 may be invoked by a "smart client" application that receives the document type from server 120, performs its own determination of the content items needed by the application based on the document type, and sends a subsequent request to the server 120 for the location information for the content items. An example sequence diagram for data exchange between a "smart client" and a server is depicted below with respect to FIG. 7.

Server 120 may receive the reduced file, invoke document classifier 122 to identify the document type for physical document 130 based on the reduced file, and send a response to data exchange optimizer 112 that includes information about the identified document type. In implementations where the client device 110 includes a "smart client," document classifier 122 may send a response that includes only the document type (e.g., invoice, driver's license, bank check, sales receipt, restaurant check, etc.). Data exchange optimizer 112 may receive the document type for the physical document, determine based on the document type, a content item for the document, and send a subsequent request to server 120 for the location information for a portion of the original image that contains the content item (e.g., the location of an invoice number, driver's license number, invoice fee due, bar code, etc. in the physical document). In some implementations, the location information may include the bounding box coordinates for the portion of the original image that contains the particular content item. In implementations where the original document image 115 is a video stream containing multiple image frames, the location information may include information identifying at least one frame of the video stream (e.g., a frame number, a frame offset within the stream, a timestamp offset within the stream where the fame may be located, etc.)

In some implementations, such as in the case of a "thin client," document classifier 122 may, in response to receiving the reduced file, additionally determine a particular content item of interest (or multiple content items of interest) based on the document type. Document classifier 122 may determine the location information based on the document type for a portion of the original image that contains the particular content item for the document (e.g., the location of the invoice number, driver's license number, invoice fee due, bar code, etc. in the physical document), and subsequently send the location information to data exchange optimizer 112.

Data exchange optimizer 112 may receive the location information from server 120, and extract, based on the location information, a portion of the original document image 115 to generate an extracted portion of the image. For example, data exchange optimizer 112 may receive the bounding box coordinates for the portion of the original image that contains the needed content item, and extract the portion of the image using those coordinates (e.g., extract the part of the image defined by the bounding box coordinates to create an image fragment that depicts the content item). In implementations, where the original document image 115 is a video stream containing multiple image frames, the portion of the original document image may include at least one frame of the video stream.

In some implementations, the extracted portion of the original image may be the same resolution as that of the original document image 115. Alternatively, the extracted image may be a lower resolution than that of the original document image 115, so long as the extracted image includes sufficient detail for the server 120 to detect the content within the extracted image.

Data exchange optimizer 112 may subsequently send a request to server 120 for the content depicted by the image fragment, where the request includes the extracted portion of the original image (e.g., the extracted image fragment that depicts the content item). In some implementations, data exchange optimizer 112 may send this request to the same server 120 as that to which the initial request was sent. Alternatively, data exchange optimizer 112 may send this request to a different server (not shown). Server 120 may then invoke document classifier 122 (or another component of server 120, or a component of another server that communicates with server 120) to perform OCR processing on the image fragment to determine the content of the fragment and return the content to client device 110.

Responsive to receiving the content from server 120, data exchange optimizer 112 may provide the content item for display by the client device via the user interface on the screen of the client device 110, store the content item in a data store on the client device, provide the content item to the application that invoked data exchange optimizer 112, provide the content item to another application (either executing on the device 110 or on server 120), or utilize the content item in any other manner.

Figure 2:
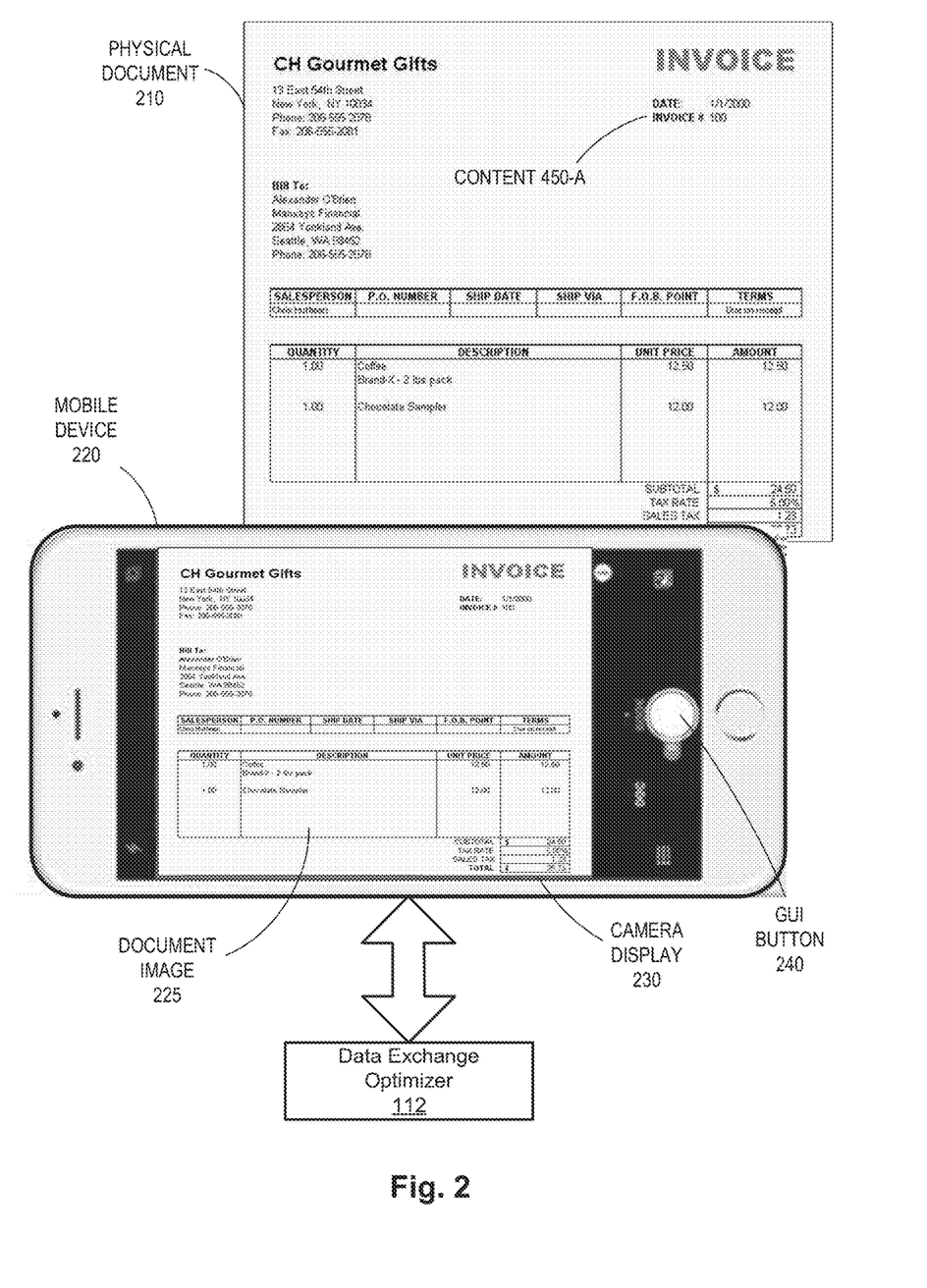
FIG. 2 depicts a graphical user interface (GUI) of a mobile device for capturing an image of a physical document, in accordance with one or more aspects of the present disclosure.

FIG. 2 depicts a graphical user interface (GUI) of a mobile device 220 for capturing an image of a physical document 210. The GUI of mobile device 220 may be presented by a stand-alone application, a component of a user interface for document manager, or in any other manner. For example, the GUI of mobile device 220 may be presented to a user by an application for capturing invoices using the camera of the mobile device. Alternatively, the GUI may be presented by the data exchange optimizer 112 of FIG. 1 as described in detail below with respect to FIG. 5.

Mobile device 220 may include an application configured to capture an image of physical document 210 using the mobile device's camera. FIG. 2 depicts physical document 210 as a printed invoice, but as noted above, physical document may be any type of document. Physical document 210 may contain content that may be extracted for use by an application executing on the mobile device 220. For example, content 450-A refers to the invoice number of physical document 210. In some implementations, a user may invoke an application on mobile device 220 to capture the invoice number and the total amount due for use with an accounting application that stores the information and initiates payment of the total amount due.

As illustrated in FIG. 2, the application may cause a GUI to be presented on mobile device 220 to assist the user with aligning physical document 210 in viewfinder of camera display 230. The application may then activate the camera to begin receiving an image through the camera of mobile device 220. Alternatively, the application may receive frames of a video stream through the camera of mobile device 220. The image (or frames of the video stream) may be displayed to the user via camera display 230. The user may capture the image of original document 210 by selecting or pressing GUI button 240 shown on the display of mobile device 220. Data exchange optimizer 112 may then receive the image and perform the data exchange optimization for the image of the physical document as described above and below with respect to FIGS. 5-7.

Figure 3:
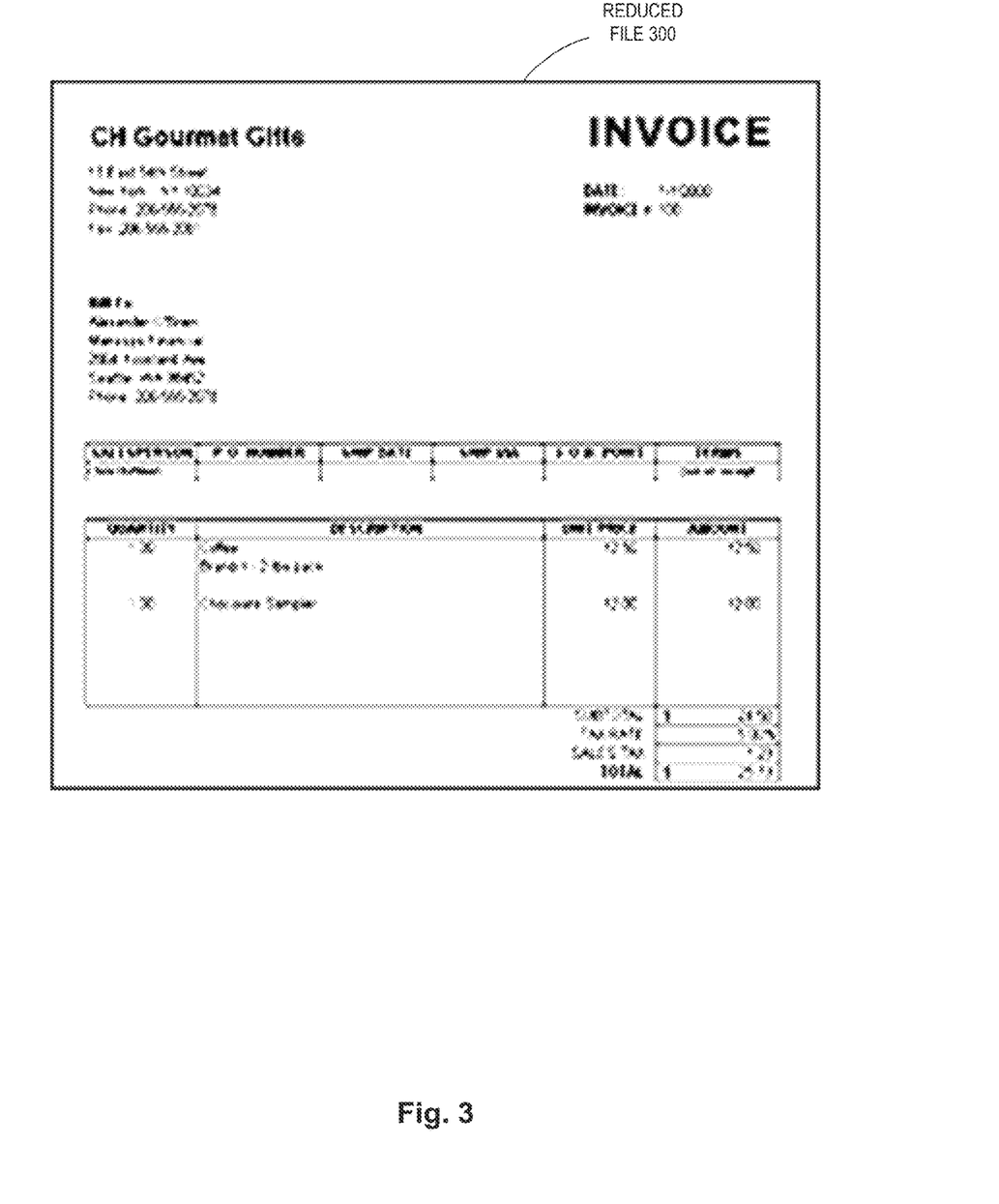
FIG. 3 illustrates an example of a reduced file created by a data exchange optimizer, in accordance with one or more aspects of the present disclosure.

FIG. 3 depicts an example of a reduced file 300 created by a data exchange optimizer in accordance with one or more aspects of the present disclosure. In one embodiment, reduced file 300 may be the product of a transformation operation performed on an image of a physical document (e.g., document image 225 of FIG. 2) in order to optimize data exchange between a client device and a server device when sending the reduced file 300 to the server for document classification and/or document identification. As noted above, reduced file 300 may be generated by performing a color to grayscale conversion on the original image, a color to black and white conversion on the original image, a data compression operation on the original image, an image resolution reduction operation on the original image, or a binarization operation on the original image.

As shown in FIG. 3, reduced file 300 depicts the result of performing an image resolution reduction operation on the original image to produce reduced file 300 that is substantially smaller in size than the original image. In various embodiments, reduced file 300 may still maintain sufficient information for a document classification system (e.g., document classifier 122 of FIG. 1) to determine the type of document depicted in reduced file 300, as well as determine location information that corresponds to various content items present in the document based on the determined document type.

Figure 4:
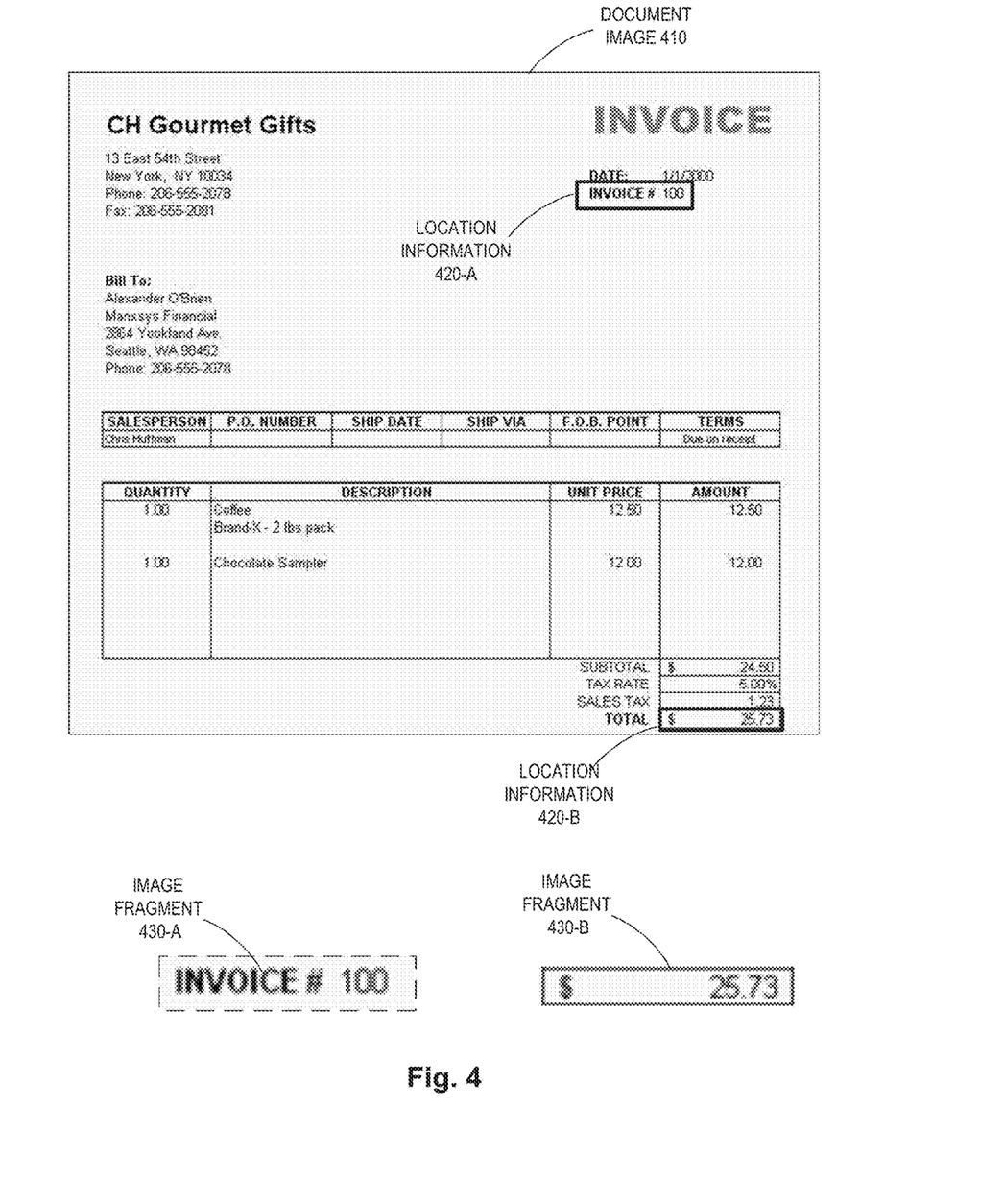
FIG. 4 illustrates an example of an original document image with location information for content items within the document image, in accordance with one or more aspects of the present disclosure.

FIG. 4 depicts an example of an original document image 410 with location information for content items within the document image 410 in accordance with one or more aspects of the present disclosure. In one embodiment, original document image 410 may correspond to document image 225 of FIG. 2. As described above, a data exchange optimizer on a client device (e.g., data exchange optimizer 112 of FIGS. 1-2) may send a request to a server device for information pertaining to the document type of original document image 410 by sending a reduced file (e.g., reduced file 300 of FIG. 3) to the server. The server may identify the document type, and return the document type to the client device along with location information for a portion of the document image 410 that contains a content item for the document. In some implementations, the client may receive bounding box coordinates for content items of interest that are associated with the particular document type of document image 410.

As shown in FIG. 4, document image 410 is an image of an invoice document. In some implementations, an application executing on the client device used to capture the image may be interested in the invoice number and the total amount due. Location information may be received from the server that describes the location of the invoice number and the total amount within the document image 410 based on the determined document type of document image 410 (an invoice). As shown in FIG. 4, location information 420-A depicts the bounding box coordinate information for the invoice number of document image 410, and location information 420-B depicts the bounding box coordinate information for the total due.

As described above, the data exchange optimizer may then extract the portions of the original document image 410 based on the location information to generate extracted portions of the original document image 410 to send to the server. The data exchange optimizer may extract the portion of document image 410 defined by the bounding box coordinates of location information 420-A to generate the image fragment 430-A that contains the portion of the original document image 410 depicting the invoice number. Similarly, the data exchange optimizer may extract the portion of document image 410 defined by the bounding box coordinates of location information 420-B to generate the image fragment 430-B that contains the portion of the original document image 410 depicting the invoice total. The data exchange optimizer may then send the image fragments 430-A and 430-B to the server for optical character recognition processing, and receive the textual content associated with the source fragments. Thus, the client device may receive the text "100" and "25.73" to be used by the client device application.

Figure 5:
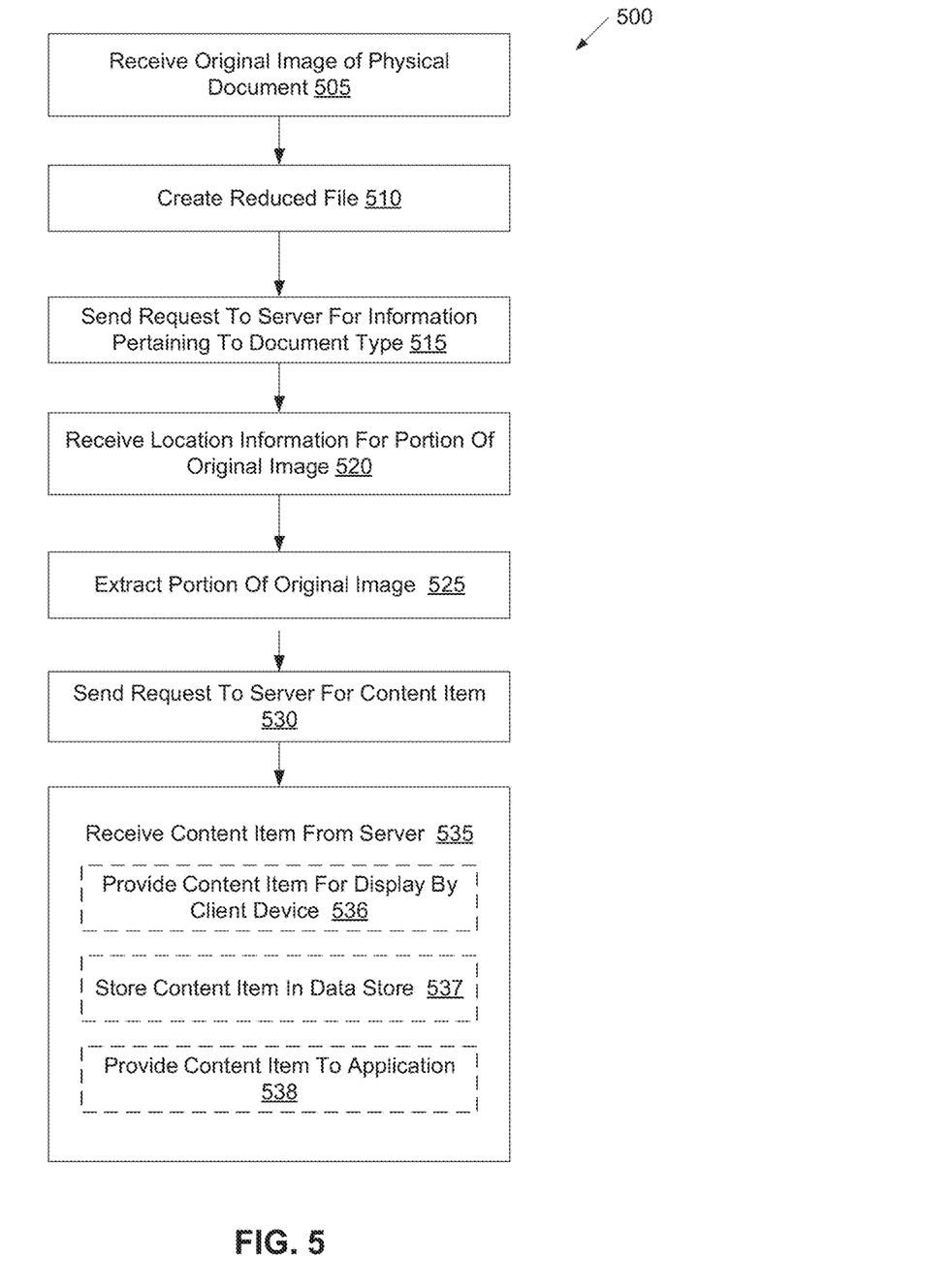
FIG. 5 depicts a flow diagram of a method for optimizing data exchange between a client device and a server, in accordance with one or more aspects of the present disclosure.

FIG. 5 depicts a flow diagram of an example method 500 for optimizing data exchange between a client device and a server. The method is performed by processing logic that may include hardware (circuitry, dedicated logic, etc.), software (such as is run on a general purpose computer system or a dedicated machine), or a combination of both. The method and/or each of its individual functions, routines, subroutines, or operations may be performed by one or more processors of a computing device (e.g., computing system 800 of FIG. 8) implementing the method. In certain implementations, the method may be performed by a single processing thread. Alternatively, the method may be performed by two or more processing threads, each thread implementing one or more individual functions, routines, subroutines, or operations of the methods. In some implementations, the method may be performed by data exchange optimizer 112 of client device 110 of FIG. 1.

For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the method could alternatively be represented as a series of interrelated states via a state diagram or events.

At block 505 of method 500, processing logic receives an original image of a physical document. At block 510, processing logic creates, based on the original image, a reduced file containing data indicative of a document type, where the reduced file is substantially smaller in size than the original image. At block 515, processing logic sends a request to a server device for information pertaining to a document type for the physical document, where the request includes the reduced file. At block 520, processing logic receives location information for a portion of the original image that contains a content item for the physical document, where the location information is based on the document type. In some implementations, the location information is made up of bounding box coordinates for the portion of the original image that contains the content item.

At block 525, processing logic extracts, based on the location information received at block 520, a portion of original image to generate (produce) an extracted portion of the original image. At block 530, processing logic sends a request to the server device for the content item, where the request includes the extracted portion of the original image.

At block 535, processing logic receives the content item from the server device. In some implementations, processing logic receives alphabetic textual content corresponding to the content item (e.g. a name on a driver's license, a company name from an invoice, a line item purchase from a receipt, etc.). Alternatively, processing logic may receive alphanumeric textual content corresponding to the content item (e.g., an amount due from an invoice, a driver's license number, a number from a bar code, price for a line item purchase from a receipt, etc.).

In one embodiment, responsive to receiving the content item, processing logic may then invoke block 536 to provide the content item for display by the client device. In one embodiment, responsive to receiving the content item, processing logic may then invoke block 537 to store the content item in a data store on the client device. In one embodiment, responsive to receiving the content item, processing logic may then invoke block 538 to provide the content item to an application running on the client device, or an application running on the server device. After block 535 (or 536, 537, 538), the method of FIG. 5 terminates.

Figure 6:
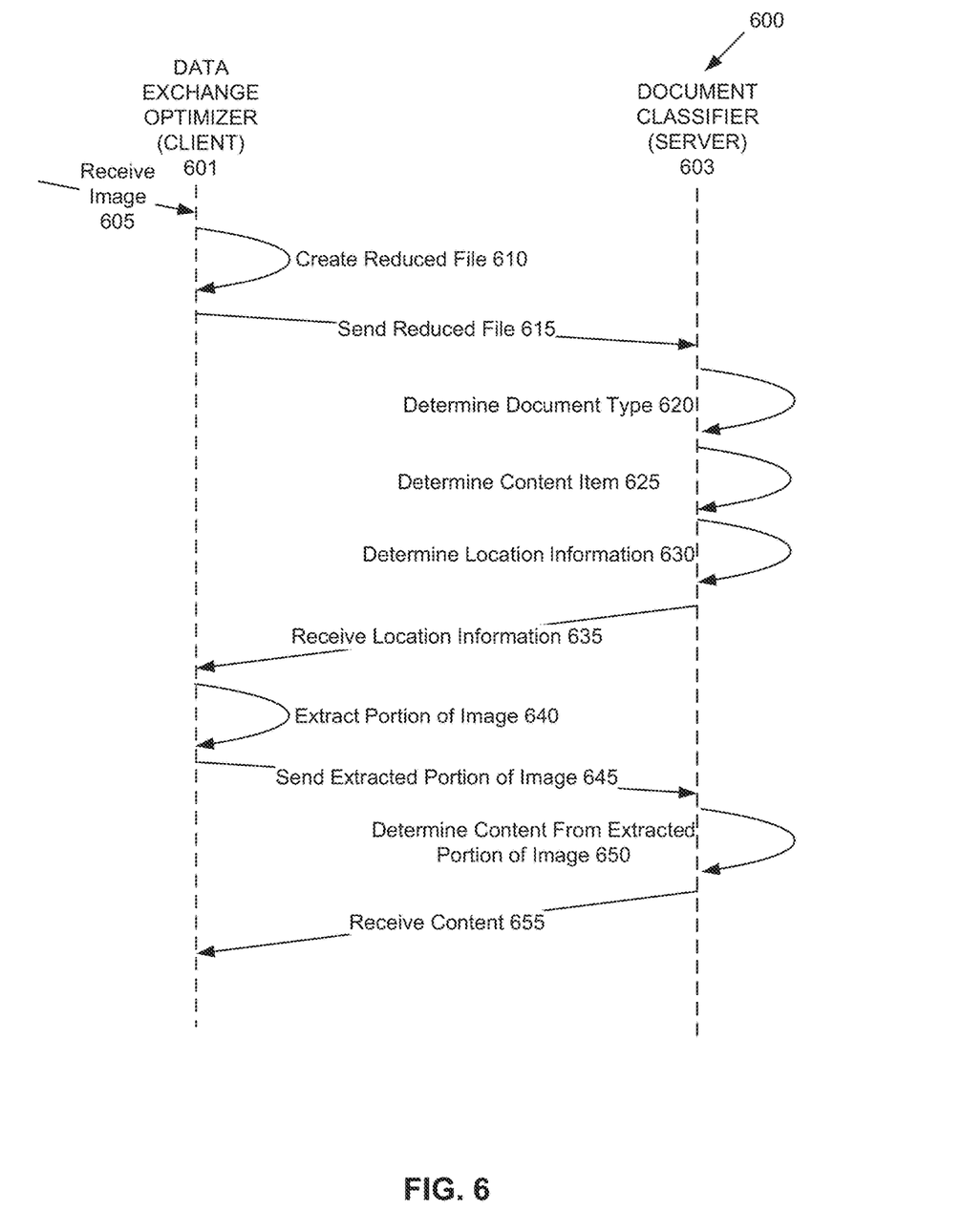
FIG. 6 depicts a sequence diagram for an embodiment of optimizing data exchange between a client device and a server, in accordance with one or more aspects of the present disclosure.

FIG. 6 depicts a sequence diagram 600 for an embodiment of optimizing data exchange between a data exchange optimizer of a "thin client" of client device 601 and a document classifier of a server device 603 in accordance with an embodiment of the present disclosure. The sequence diagram 600 shows that the data exchange optimizer 601 may reduce the amount of data sent to the document classifier 603 in situations where networking bandwidth is constrained. Additionally, sequence diagram 600 depicts an embodiment where the document classifier 603 performs the determination of the content items of interest to the client device based on the document type.

Initially, the data exchange optimizer 601 may receive an original image of a physical document (605). The data exchange optimizer 601 may then create a reduced file (610), and send the reduced file to the document classifier 603 with a request for location information (615). The document classifier 603 may then determine the document type based on the reduced file (620), determine a content item within the document based on the document type (625), determine location information for the content item (630), and send a response to the data exchange optimizer 601 on the client device.

The data exchange optimizer 601 may then receive the location information from the document classifier 603 (635), extract a portion of the original image designated by the location information (640), and send the extracted portion of the original image to document classifier 603 with a request for the content within the extracted portion (645). Document classifier 603 may then determine the content from the extracted portion of the original image (650) by, for example, performing OCR operations on the extracted portion. The data exchange optimizer 601 may subsequently receive the content item from the document classifier 603 (655).

Figure 7:
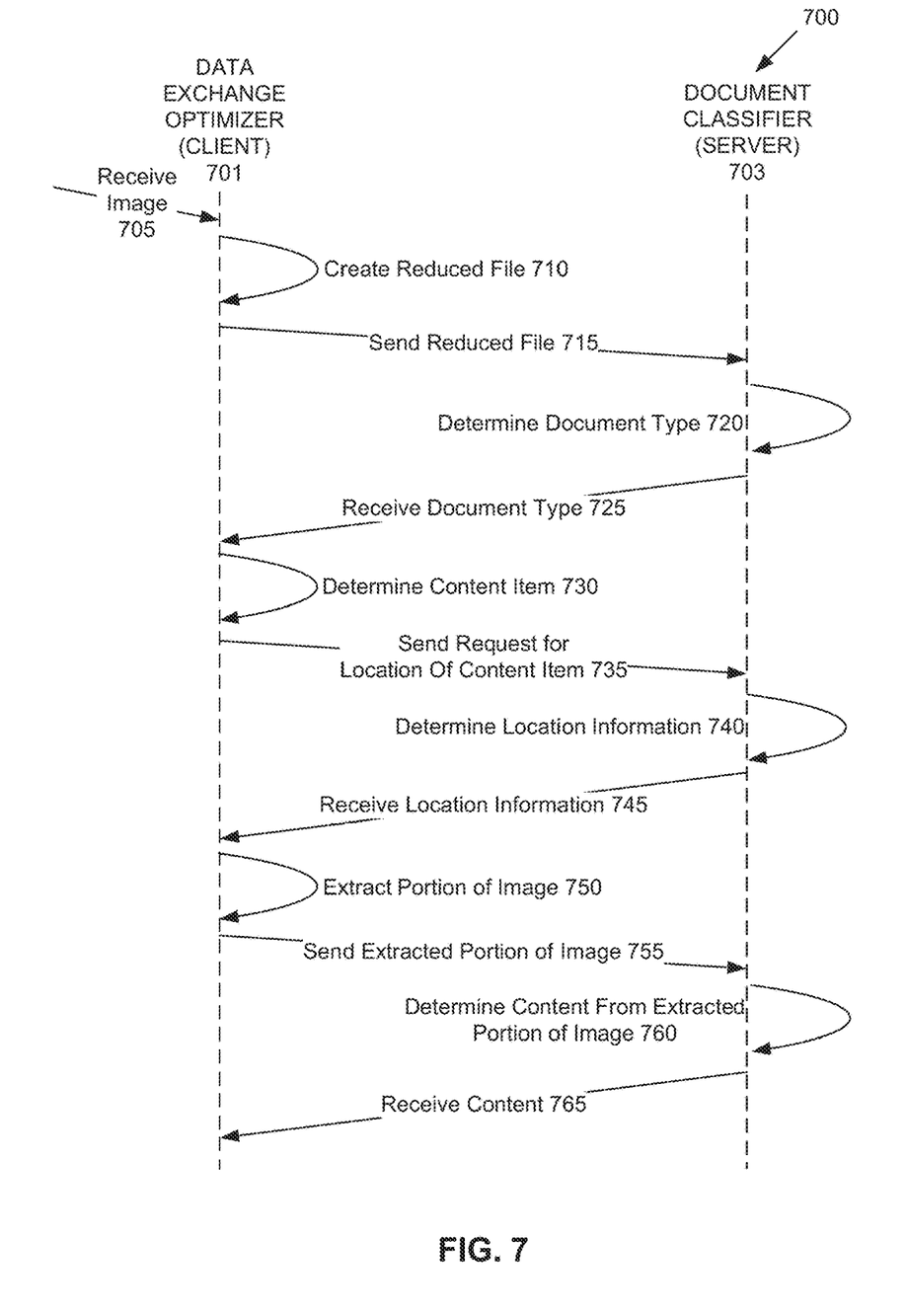
FIG. 7 depicts a sequence diagram for an embodiment of optimizing data exchange between a client device and a server, in accordance with one or more aspects of the present disclosure.

FIG. 7 depicts a sequence diagram 700 for an embodiment of optimizing data exchange between a data exchange optimizer of a "smart client" of client device 701 and a document classifier of a server device 703 in accordance with an embodiment of the present disclosure. The sequence diagram 700 shows that the data exchange optimizer 701 may reduce the amount of data sent to the document classifier 703 in situations where networking bandwidth is constrained. Additionally, sequence diagram 700 depicts an embodiment where the data exchange optimizer 701 performs the determination of the content items of interest to the client device based on the document type received from document classifier 703.

Initially, the data exchange optimizer 701 may receive an original image of a physical document (705). The data exchange optimizer 701 may then create a reduced file (710), and send the reduced file to the document classifier 703 with a request for the document type (715). The document classifier 703 may then determine the document type based on the reduced file (720), and send a response to the data exchange optimizer 701 on the client device with the document type.

The data exchange optimizer 701 may then receive the document type from the document classifier 703 (725), determine a content item within the document based on the document type (730), and send a request to document classifier 703 for the location of the content item within the document (735). Thus, in some embodiments, the data exchange optimizer 701 may control the content items to be extracted from the document image. The document classifier 703 may then determine location information for the content item (740), and send a response to data exchange optimizer 701.

The data exchange optimizer 701 may then receive the location information from the document classifier 703 (745), extract a portion of the original image designated by the location information (750), and send the extracted portion of the original image to document classifier 703 with a request for the content within the extracted portion (755). Document classifier 703 may then determine the content from the extracted portion of the original image (760) by, for example, performing OCR operations on the extracted portion. The data exchange optimizer 701 may subsequently receive the content item from the document classifier 703 (765).

Figure 8:
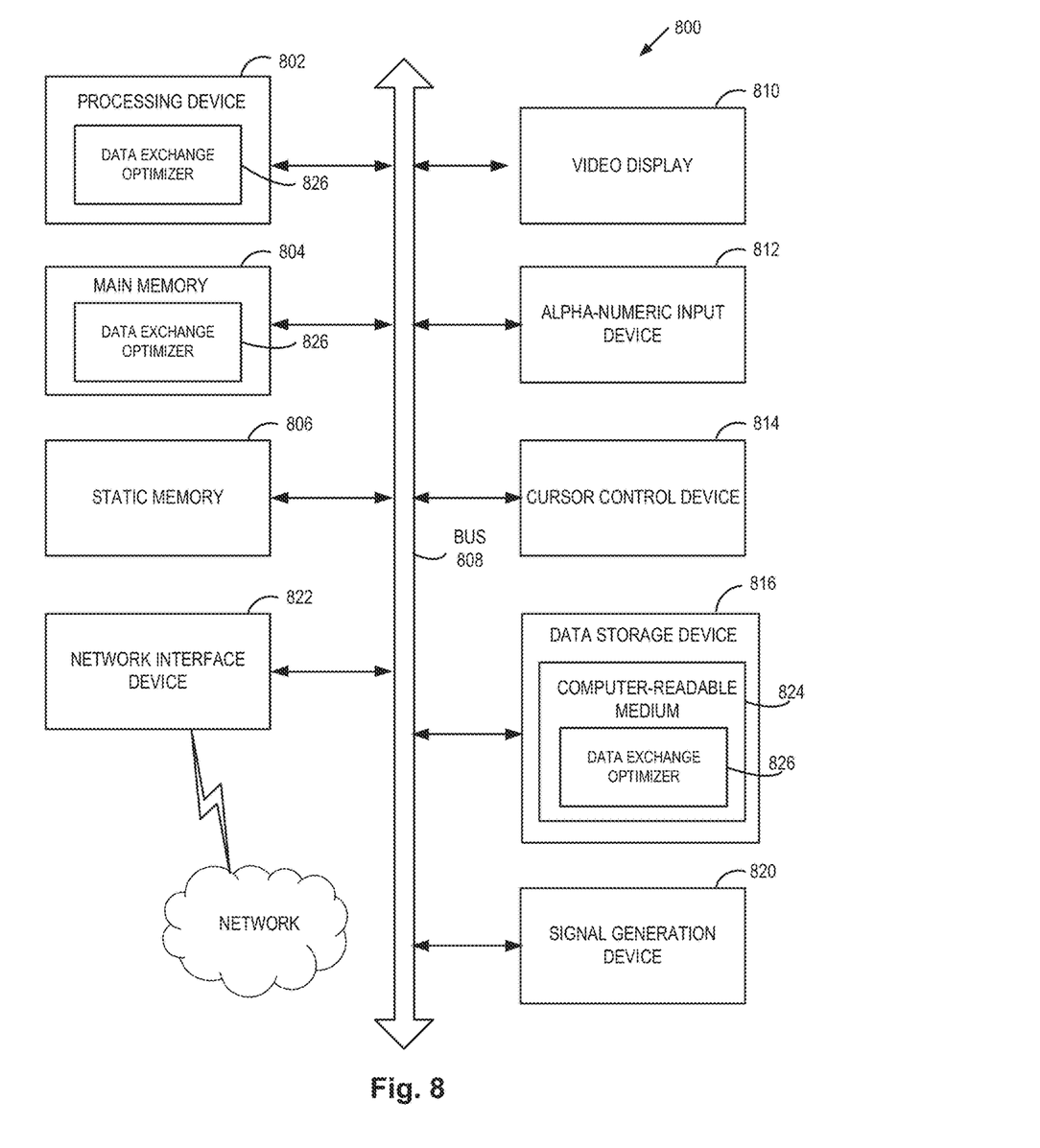
FIG. 8 depicts a block diagram of an illustrative computer system operating in accordance with examples of the present disclosure.

FIG. 8 depicts an example computer system 800 which can perform any one or more of the methods described herein. In one example, computer system 800 may correspond to a computing device capable of executing data exchange optimizer 112 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute data exchange optimizer 826 for performing the operations and steps discussed herein (e.g., corresponding to the method of FIG. 5, etc.).

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored data exchange optimizer 826 (e.g., corresponding to the method of FIG. 5, etc.) embodying any one or more of the methodologies or functions described herein. Data exchange optimizer 826 may also reside, completely or at least partially, within the main memory 804 and/or within the processing device 802 during execution thereof by the computer system 800, the main memory 804 and the processing device 802 also constituting computer-readable media. Data exchange optimizer 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "creating," "sending," "extracting," "providing," "storing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method to optimize data exchange between a client device and a server device, the method comprising:
   receiving, by a processing device of the client device, an original image of a physical document;
   creating, based on the original image, a reduced file containing data indicative of a document type, the file being substantially smaller in size than the original image;
   sending a first request to the server device for information pertaining to the document type for the physical document, wherein the first request comprises the reduced file;
   receiving, from the server device, location information for at least one portion of the original image that contains at least one content item for the physical document, the location information being based on the document type;
   extracting, based on the location information, the at least one portion of the original image to generate at least one extracted portion of the original image;
   sending a second request to the server device for the at least one content item, wherein the second request comprises the at least one extracted portion of the original image; and
   responsive to receiving the at least one content item from the server device, providing the at least one content item for display by the client device.

2. The method of claim 1, wherein the location information comprises bounding box coordinates for the at least one portion of the original image that contains the at least one content item.

3. The method of claim 2, further comprising:
   receiving, from the server device, the document type for the physical document;
   determining, based on the document type, the at least one content item for the document; and
   sending a third request to the server device for the bounding box coordinates for the at least one content item.

4. The method of claim 1, wherein creating the reduced file comprises:
   transforming the original image by performing at least one of a color to grayscale conversion, a color to black and white conversion, a data compression operation, an image resolution reduction operation, or a binarization operation.

5. The method of claim 1, wherein creating the reduced file comprises selecting a fragment of the original image as the reduced file.

6. The method of claim 1, wherein the at least one extracted portion of the original image is a same resolution as the original image.

7. The method of claim 1, further comprising:
   providing the at least one content item to at least one of an application executing on the client device, or an application executing on the server device.

8. The method of claim 1, further comprising:
   storing the at least one content item in a data store on the client device.

9. The method of claim 1, wherein the original image comprises a video stream of a plurality of image frames, and wherein the location information comprises information identifying at least one frame of the plurality of image frames, and wherein the at least one portion of the original image comprises the at least one frame.

10. The method of claim 1, wherein the second request is sent to a second server device; and the at least one content item is received from the second server device.

11. A computing apparatus comprising:
a memory to store instructions; and
a processing device, operatively coupled to the memory, to execute the instructions, wherein the processing device is to:
receive an original image of a physical document;
create, based on the original image, a reduced file containing data indicative of a document type, the file being substantially smaller in size than the original image;
send a first request to a server device for information pertaining to the document type for the physical document, wherein the first request comprises the reduced file;
receive, from the server device, location information for at least one portion of the original image that contains at least one content item for the physical document, the location information being based on the document type;
extract, based on the location information, the at least one portion of the original image to generate at least one extracted portion of the original image;
send a second request to the server device for the at least one content item, wherein the second request comprises the at least one extracted portion of the original image; and
responsive to receiving the at least one content item from the server device, provide the at least one content item for display by a client device.

12. The computing apparatus of claim 11, wherein the location information comprises bounding box coordinates for the at least one portion of the original image that contains the at least one content item.

13. The computing apparatus of claim 12, wherein to the processing device is further to:
receive, from the server device, the document type for the physical document;
determine, based on the document type, the at least one content item for the document; and
send a third request to the server device for the bounding box coordinates for the at least one content item.

14. The computing apparatus of claim 11, wherein to create the reduced file the processing device is to:
transform the original image by performing at least one of a color to grayscale conversion, a color to black and white conversion, a data compression operation, an image resolution reduction operation, or a binarization operation.

15. The computing apparatus of claim 11, wherein to create the reduced file the processing device is to:
select a fragment of the original image as the reduced file.

16. The computing apparatus of claim 11, wherein the at least one extracted portion of the original image is a same resolution as the original image.

17. The computing apparatus of claim 11, wherein the processing device is further to:
provide the at least one content item to at least one of an application executing on the client device, or an application executing on the server device.

18. The computing apparatus of claim 11, wherein the processing device is further to:
store the at least one content item in a data store on the client device.

19. The computing apparatus of claim 11, wherein the original image comprises a video stream of a plurality of image frames, and wherein the location information comprises information identifying at least one frame of the plurality of image frames, and wherein the at least one portion of the original image comprises the at least one frame.

20. The computing apparatus of claim 11, wherein the second request is sent to a second server device; and the at least one content item is received from the second server device.

21. A non-transitory computer readable storage medium, having instructions stored therein, which when executed by a processing device of a client device, cause the processing device to perform operations comprising:
receiving, by the processing device of the client device, an original image of a physical document;
creating, based on the original image, a reduced file containing data indicative of a document type, the file being substantially smaller in size than the original image;
sending a first request to a server device for information pertaining to the document type for the physical document, wherein the first request comprises the reduced file;
receiving, from the server device, location information for at least one portion of the original image that contains at least one content item for the physical document, the location information being based on the document type;
extracting, based on the location information, the at least one portion of the original image to generate at least one extracted portion of the original image;
sending a second request to the server device for the at least one content item, wherein the second request comprises the at least one extracted portion of the original image; and
responsive to receiving the at least one content item from the server device, providing the at least one content item for display by the client device.

22. The non-transitory computer readable storage medium of claim 21, wherein the location information comprises bounding box coordinates for the at least one portion of the original image that contains the at least one content item.

23. The non-transitory computer readable storage medium of claim 22, wherein the processing device performs operations further comprising:
receiving, from the server device, the document type for the physical document;
determining, based on the document type, the at least one content item for the document; and
sending a third request to the server device for the bounding box coordinates for the at least one content item.

24. The non-transitory computer readable storage medium of claim 21, wherein creating the reduced file comprises:
transforming the original image by performing at least one of a color to grayscale conversion, a color to black and white conversion, a data compression operation, an image resolution reduction operation, or a binarization operation.

25. The non-transitory computer readable storage medium of claim 21, wherein creating the reduced file comprises selecting a fragment of the original image as the reduced file.

26. The non-transitory computer readable storage medium of claim 21, wherein the at least one extracted portion of the original image is a same resolution as the original image.

27. The non-transitory computer readable storage medium of claim 21, wherein the processing device performs operations further comprising:

providing the at least one content item to at least one of an application executing on the client device, or an application executing on the server device.

28. The non-transitory computer readable storage medium of claim 21, wherein the processing device performs operations further comprising:
storing the at least one content item in a data store on the client device.

29. The non-transitory computer readable storage medium of claim 21, wherein the original image comprises a video stream of a plurality of image frames, and wherein the location information comprises information identifying at least one frame of the plurality of image frames, and wherein the at least one portion of the original image comprises the at least one frame.

30. The non-transitory computer readable storage medium of claim 21, wherein the second request is sent to a second server device; and the at least one content item is received from the second server device.

* * * * *